(12) United States Patent
Fuentes et al.

(10) Patent No.: US 12,077,382 B2
(45) Date of Patent: Sep. 3, 2024

(54) CLOUDPICK PUT-TO-LIGHT PICKING SYSTEM

(71) Applicant: PFSweb, Inc., Dallas, TX (US)

(72) Inventors: Mark Fuentes, Dallas, TX (US); Drew Jolesch, Dallas, TX (US); Kevin Ragsdale, Dallas, TX (US); Kirk Williams, Dallas, TX (US)

(73) Assignee: PFSWEB, INC., Dallas, TX (US)

( * ) Notice: Subject to any disclaimer, the term of this patent is extended or adjusted under 35 U.S.C. 154(b) by 489 days.

(21) Appl. No.: 17/155,045

(22) Filed: Jan. 21, 2021

(65) Prior Publication Data

US 2021/0221616 A1 Jul. 22, 2021

Related U.S. Application Data

(60) Provisional application No. 62/964,223, filed on Jan. 22, 2020.

(51) Int. Cl.
| | | |
|---|---|---|
| *B65G 1/137* | (2006.01) | |
| *G05B 15/02* | (2006.01) | |
| *G05D 1/00* | (2006.01) | |
| *G05D 1/02* | (2020.01) | |
| *G06Q 10/08* | (2023.01) | |
| *G06Q 10/0875* | (2023.01) | |

(52) U.S. Cl.
CPC ......... *B65G 1/1375* (2013.01); *B65G 1/1371* (2013.01); *G05B 15/02* (2013.01); *G05D 1/0217* (2013.01); *G06Q 10/0875* (2013.01)

(58) Field of Classification Search
CPC ................ B65G 1/1375; B65G 1/1371; G06Q 10/0875; G05D 2201/0216; G05D 1/0217; G05B 15/02
See application file for complete search history.

(56) References Cited

U.S. PATENT DOCUMENTS

| | | | | |
|---|---|---|---|---|
| 5,877,962 A | * | 3/1999 | Radcliffe | G06Q 10/087 705/28 |
| 6,775,588 B1 | * | 8/2004 | Peck | B65G 1/1373 700/214 |
| 6,876,902 B2 | * | 4/2005 | Nikolich | B65G 1/1373 700/242 |

(Continued)

OTHER PUBLICATIONS

EPO Communication for Supplementary European Search Report, Application No. EP 21744853.9; dated Jan. 22, 2024; 13 pages.

*Primary Examiner* — Michael Collins
(74) *Attorney, Agent, or Firm* — KLEMCHUK PLLC

(57) ABSTRACT

A picking system may provide a fast, flexible pick cart solution that may be deployed in warehouses or distribution centers to enable users to pick multiple items to put into a plurality of order bins (or carts) with high speed and accuracy to create completed orders ready for packing and shipping. Hardware and software may be bundled on the carts which may shorten training times, simplify integration, and allow for adjustment of carts based on product/items needs, all while improving picking efficiency. The picking system may include a cloud-based computer platform that may control light and displays in the lighted pick shelves that direct users to place a specified quantity of items in specific order bins. Users in remote locations may be linked to the cloud-based computer platform that may control lighted pick shelves in the users' locations.

19 Claims, 3 Drawing Sheets

(56) References Cited

U.S. PATENT DOCUMENTS

| | | | |
|---|---|---|---|
| 10,769,579 B1 | 9/2020 | Smith et al. | |
| 10,803,420 B2* | 10/2020 | Jarvis | G06Q 10/0875 |
| 11,113,661 B2* | 9/2021 | Rahilly | G06F 21/32 |
| 2003/0035708 A1* | 2/2003 | de Jong | B65G 13/12 |
| | | | 414/276 |
| 2003/0158627 A1* | 8/2003 | Nikolich | A61B 50/13 |
| | | | 700/242 |
| 2004/0153207 A1 | 8/2004 | Peck | |
| 2005/0043850 A1* | 2/2005 | Stevens | B65G 1/1378 |
| | | | 700/213 |
| 2007/0050080 A1 | 3/2007 | Peck | |
| 2008/0183328 A1* | 7/2008 | Danelski | G06Q 10/08 |
| | | | 705/28 |
| 2012/0203377 A1* | 8/2012 | Paydar | G07F 9/002 |
| | | | 221/92 |
| 2013/0312371 A1* | 11/2013 | Ambrose | B65G 1/137 |
| | | | 53/235 |
| 2014/0336814 A1* | 11/2014 | Moore | G06Q 10/0875 |
| | | | 700/216 |
| 2015/0081088 A1* | 3/2015 | Lyon | H04L 67/10 |
| | | | 700/216 |
| 2015/0169597 A1* | 6/2015 | Edge | G06Q 30/06 |
| | | | 707/751 |
| 2017/0278055 A1* | 9/2017 | Winkler | G06Q 10/08 |
| 2018/0025460 A1* | 1/2018 | Watanabe | G06Q 50/28 |
| | | | 705/28 |
| 2018/0096299 A1* | 4/2018 | Jarvis | G05D 1/246 |
| 2018/0130017 A1* | 5/2018 | Gupte | G01N 33/00 |
| 2020/0410446 A1* | 12/2020 | Rahilly | G07F 17/0092 |

\* cited by examiner

CLOUDPICK PUT-TO-LIGHT PICKING SYSTEM

CROSS REFERENCE TO RELATED APPLICATION

This application claims the benefit under 35 U.S.C. § 119(e) of U.S. Provisional Patent Application Ser. No. 62/964,223 filed on Jan. 22, 2020, entitled "Cloudpick Put-To-Light Picking System," which is incorporated by reference in its entirety.

FIELD OF THE DISCLOSURE

The present disclosure generally relates to picking systems to create orders having multiple items, and more particularly to cloud-based picking systems using customized software, high-speed communication, and specialized hardware controlled remotely.

BACKGROUND

Picking schemes have been used to create orders in warehouses or distribution centers when there are multiple items in each order. These picking schemes are typically performed as a voice-controlled process. Workers must be trained to do picking in distribution centers, and it can often be inefficient and inaccurate.

SUMMARY

Embodiments of the present disclosure may provide a put-to-light picking system that may comprise a warehouse management system (WMS), a computer system connected to the WMS, at least one pick cart, a control box, and a handheld scanner. The computer system may be connected to the WMS through an application programming interface (API). The at least one pick cart may comprise a plurality of shelves, a plurality of order totes on the plurality of shelves, at least four wheels, a cart display, and a plurality of display buttons that may be affixed to the plurality of shelves, where each plurality of display buttons may correspond to the plurality of order totes. The plurality of display buttons may comprise an order ID display. The control box may comprise a light display controller, a cart controller, and a Wi-Fi connector. The system may further comprise a plurality of lights spaced around the warehouse that may be connected to the computer system and the light display controller and may guide a pick cart user from one product to the next. The cart display may be operable to display the next product to be gathered, its location in the warehouse, and instructions for the shortest route to that location. The pick cart may further comprise at least four wheels. The plurality of display buttons may further comprise an OK button, a plus button, and a minus button. The computer system may provide access to real-time progress of the at least one pick cart. The plurality of display buttons may be operable to light up a plurality of colors. These colors may be used to indicate if only one of a given product is needed for an order or if more than one is needed. The handheld scanner may be a radio-frequency (RF) barcode scanner. The put-to-light system may further comprise a code sheet that may allow the handheld scanner to perform a variety of functions that may include logging in to the pick cart, logging out of the pick cart, identifying a product, and identifying short picks.

Embodiments of the present disclosure may provide a method for collecting products to fulfill online orders using a put-to-light computer system. The system may receive a customer order from a client WMS. The system may then transmit at least one order to a cart controller associated with a pick cart, the at least one order may identify at least one product. The system may then transmit information about a first product identified in the at least one order and its location in the warehouse to the cart controller. The system may then receive confirmation from the cart controller that the first product has been located and placed in the pick cart. The system may transmit information about a second product identified in the at least one order and its location in the warehouse to the cart controller. The system may repeat the transmitting information and receiving confirmation steps until each of the at least one order assigned to the pick cart has been filled.

The system may receive a signal from a handheld scanner that the pick cart has arrived at a location in the warehouse for each of the at least one product identified in the at least one order, and the system may transmit a signal to a plurality of display buttons to illuminate if the at least one product is to be placed in the pick cart. The system may also transmit instructions to a plurality of display buttons to illuminate a different color if more than one of the at least one product is to be placed in the pick cart. The system may transmit signals to a plurality of lights placed throughout the warehouse to illuminate and guide the pick cart to a location of a next product identified in the at least one order. The computer system may transmit real-time progress of the pick cart to the client WMS. The computer system may receive a signal from a handheld scanner that a user has logged in to the pick cart, wherein the system may transmit at least one order to the pick cart. The system may calculate the most efficient route through the warehouse for each of the at least one product identified in the at least one order.

Embodiments of the present disclosure may provide a method for collecting products to fulfill online orders using a put-to-light computer system. The system may receive a customer order from a client WMS through a third-party hosting service. It may then transmit at least one order to a cart controller associated with a pick cart, the at least one order may identify at least one product. The system may then transmit information about a first product identified in the at least one order and its location in the warehouse to the cart controller. The system may then receive confirmation from the cart controller that the first product has been located and placed in the pick cart. The system may transmit information about a second product identified in the at least one order and its location in the warehouse to the cart controller. The system may repeat the transmitting information and receiving confirmation steps until each of the at least one order assigned to the pick cart has been filled. The system may receive a signal from a handheld scanner that a pick cart has arrived at a location in the warehouse for each of the at least one product identified in the at least one order and the system may transmit a signal to a plurality of display buttons to illuminate if the at least one product is to be placed in the pick cart. The system may also transmit instructions to a plurality of display buttons to illuminate a different color if more than one of the at least one product is to be placed in the pick cart.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may provide a CloudPick put-to-light picking system to create and fill orders comprising multiple items in each order. The system according to embodiments of the present disclosure may apply cloud-based control using customized software, high-speed communication, and specialized hardware controlled remotely using the CloudPick computer system. Users may pick multiple products to be placed into larger numbers of orders, faster and with greater accuracy than with other picking systems. Embodiments of the present disclosure may provide flexibility to deploy high-speed, high-accuracy picking quickly and easily in any location. Systems according to embodiments of the present disclosure may offer scalability from a single lighted pick shelf to hundreds of pick carts quickly and easily and may offer flexibility to relocate the picking system anywhere that an Internet connection exists.

As will be described in more detail below, CloudPick pick carts may be equipped with LED lights, or other similar lighting mechanisms, that enable put-to-light picking, one of the most effective and efficient picking methods to break larger quantities of product into individual customer orders. Put-to-light picking is a batch picking operation that may be used in direct-to-consumer e-commerce or catalog fulfillment and may use light modules that direct pickers (users) to the correct location to sort or "put" items.

A warehouse management system (WMS) may communicate shipments and pick path information to the CloudPick computer system via an application programming interface (API) connection transmitted over Wi-Fi or another similar communication method in embodiments of the present disclosure. After initiating the pick process, the CloudPick computer system may direct the picker (or user as described herein) through the pick path within a warehouse or distribution center. Upon arriving at each item/product, the picker may scan each item/product's barcode, and the lights below the corresponding orders/totes on the cart may light up, displaying the quantity required. The picker may push each light to confirm the "put" after placing the item/product(s) in the tote.

Figure 1:
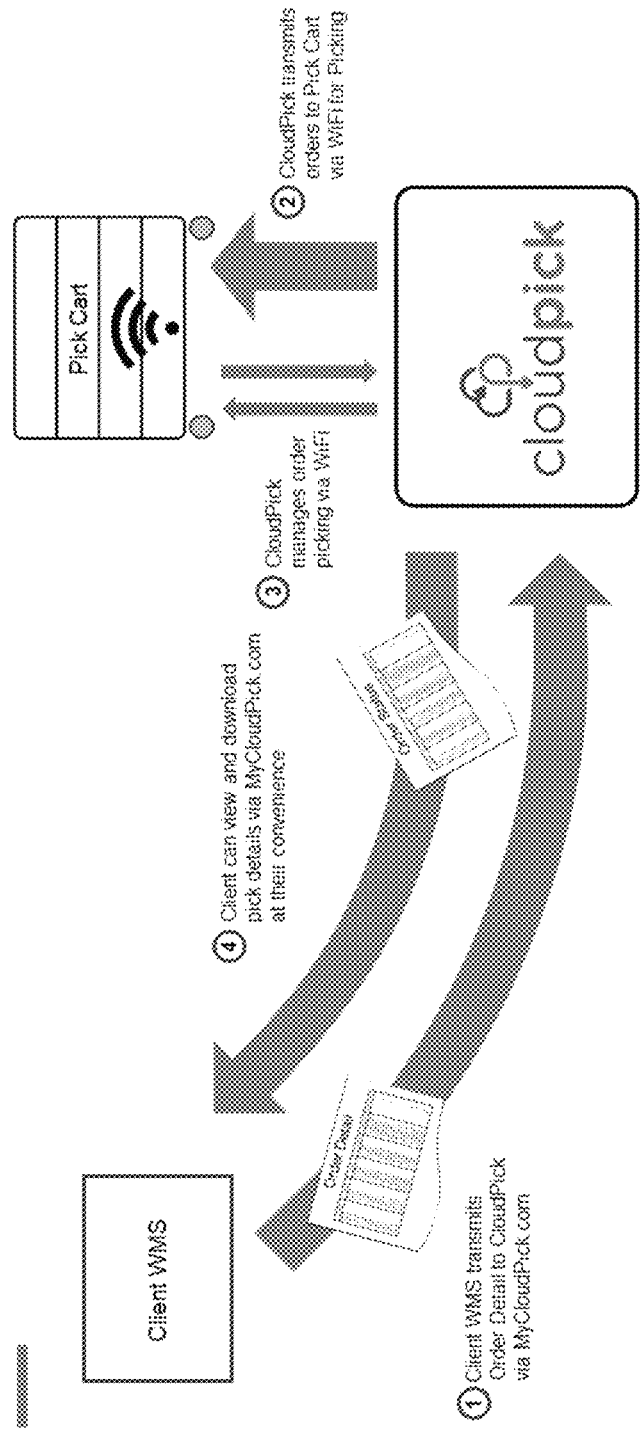
FIG. 1 depicts a picking system according to an embodiment of the present disclosure.

FIG. 1 depicts a picking system according to an embodiment of the present disclosure. In a first step (1), the client warehouse management system (WMS) may transmit an order detail to the CloudPick computer system via a website, such as MyCloudPick.com. The CloudPick computer system may include cloud-based software running on an IBM iSeries platform in an embodiment of the present disclosure. However, other platforms may be utilized without departing from the present disclosure.

The CloudPick computer system according to embodiments of the present disclosure may guide a user through very high throughput processes that may facilitate highly productive picking of multi-line orders or other similar sorting tasks that may require rapidly placing multiple items in correct quantities in multiple locations. Processes may include, but are not limited to, quick cart setup that may identify each order on the CloudPick pick cart with a specific lighted "click and go" button (or other similar type button) and its numeric/text display panel, efficient picking by guiding the picker (user) through the most efficient path to each pick location (or pick face) where an item may be stored, rapid picking using a put-to-light process that tells the picker where to put the item and how many of the item should be put in each location, and/or efficient clearing of orders that may have been short-picked because items may not be available.

The website, such as MyCloudPick.com, may be one that allows users to perform various functions, including, but not limited to, create an account, upload order details to a CloudPick cart controller, view order status, and/or retrieve reports on picking activity. For example, a user may log into his/her account on the MyCloudPick.com website (or another similar log-in mechanism that may be provided) and upload the order detail. An order detail may include various types of order information including, but not limited to, a client ID, a carton ID, a line ID, a pick location, a barcode/UPC, and/or a quantity to be picked. While there may be embodiments of the present disclosure where each of these types of order information may be included in an order detail, it should be appreciated that there may be other embodiments of the present disclosure where more or fewer types of order information may be included without departing from the present disclosure. In embodiments of the present disclosure, the order detail may be a comma separated values (CSV) file or another file format as specified by the system.

In other embodiments of the present disclosure, there may be a direct connection established between the user and the user's (or client's) warehouse management system (WMS). The website and/or WMS may be supported via Amazon Web Services (AWS) in an embodiment of the present disclosure, such as described in more detail with respect to FIG. 2. Once the order detail has been provided, the subsequent communication may occur between the CloudPick computer system and the CloudPick pick carts. It should be appreciated that AWS also may be utilized to provide reports back to the user through the website and/or the WMS in embodiments of the present disclosure.

In a second step (2), the CloudPick computer system may transmit orders to a pick cart (also referred to as a CloudPick pick cart herein) via Wi-Fi, or another similar remote communication platform/mechanism, for picking. The user of the CloudPick pick cart may log in and set up his/her CloudPick pick cart with a pick ticket that may identify each tote with a specific order.

In a third step (3), the CloudPick computer system may manage order picking over Wi-Fi or another similar remote communication platform/mechanism. The CloudPick computer system may direct the user of the CloudPick pick cart to the location (i.e., provide a pick zone and/or pick face) from which to pick the orders currently associated with the CloudPick pick cart. Using a barcode scanner (as described in more detail in FIG. 3) associated with the CloudPick pick cart, the user may scan a first item to be picked. The CloudPick computer system may illuminate lights on the CloudPick pick cart that identify which orders should contain the first item and how many of that item go into each order. The user may insert the required items into each tote and click the response button (i.e., display button 1, FIG. 3) to indicate that the order has been filled with the first item. The CloudPick cart controller may turn the light off on each order as it is filled. When all orders containing that item have been filled, the user may scan the next item to be picked, and the process may repeat with respect to illumination of lights to identify orders that should contain the next item and how many of that item go into each order.

In a fourth step (4), the client may view and download pick (or order) details via a website, such as MyCloudPick.com, and/or WMS as previously described. While Wi-Fi may be used for transmitting orders to a pick cart and for managing order picking, it should be appreciated that other forms of wireless communication may be utilized without departing from the present disclosure. Further, while some steps describe use of a website and/or WMS, it should be appreciated that other transmission or management mechanism may be used without departing from the present disclosure. In addition, while embodiments of the present disclosure may utilize AWS, it should be appreciated that the system may be utilized with other web infrastructures or mechanisms without departing from the present disclosure.

Figure 2:
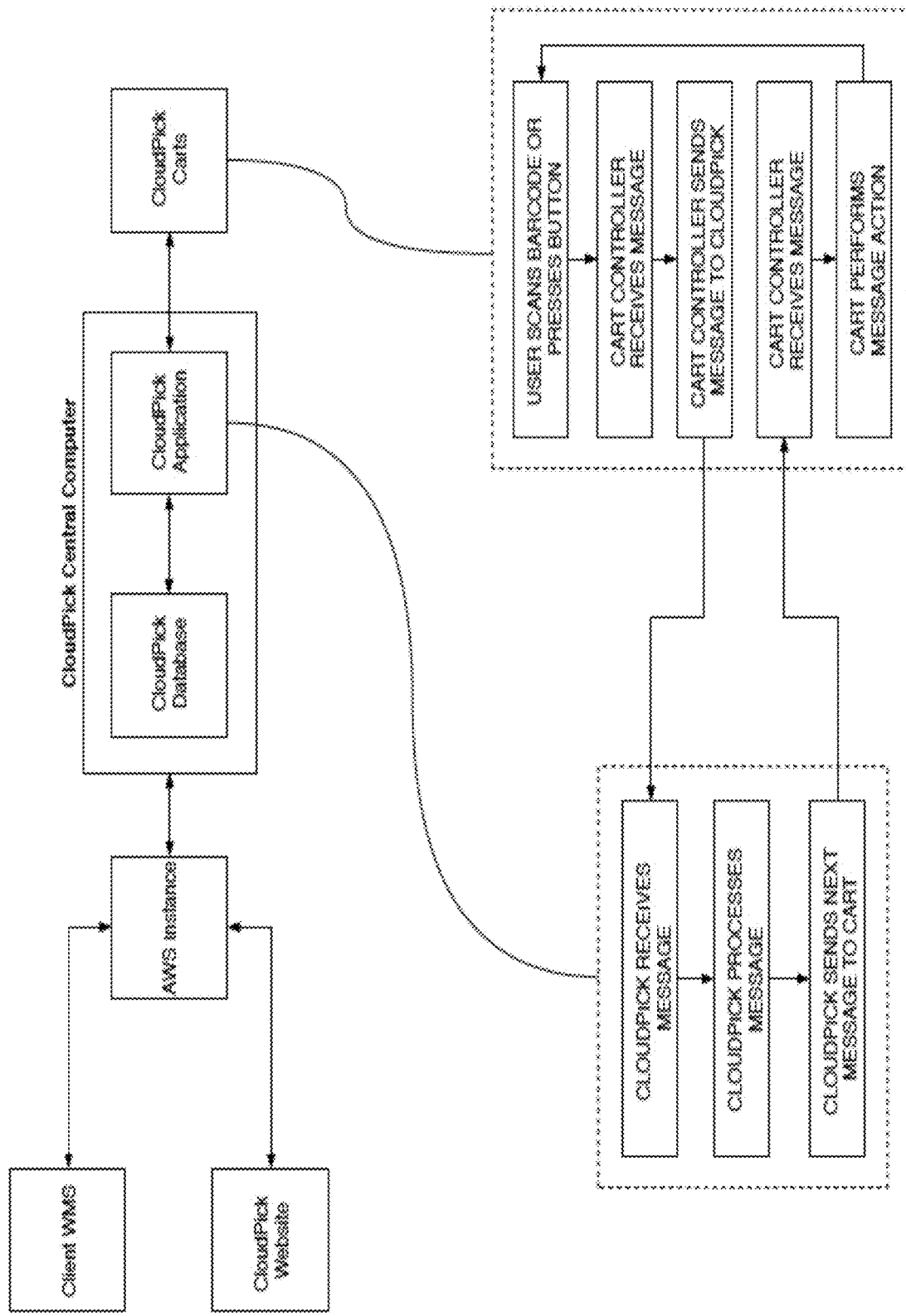
FIG. 2 depicts a more detailed view of a picking system according to an embodiment of the present disclosure.

FIG. 2 depicts a more detailed view of a picking system according to an embodiment of the present disclosure. Like FIG. 1, FIG. 2 depicts a client WMS that may communicate with a CloudPick computer system. The client WMS may communicate with an Amazon Web Services (AWS) instance that then may communicate with the CloudPick computer system. A CloudPick website also may communicate with an AWS instance that then may communicate with the CloudPick computer system in embodiments of the present disclosure. The CloudPick computer system may include at least one CloudPick database and at least one CloudPick application that communicate with one another. The at least one CloudPick application that may then communicate with CloudPick pick carts as depicted in FIG. 2.

The CloudPick pick carts may communicate each action that may be taken in real time to the CloudPick computer system via Wi-Fi and/or the Internet. The CloudPick computer system may then respond with instructions for the next step for the CloudPick pick cart and/or the user to complete. This real-time communication and control may guide users through the most efficient path to completion of the picking process in embodiments of the present disclosure.

FIG. 2 depicts a flow chart of steps that may be utilized in communication between the CloudPick computer system and the CloudPick pick carts in embodiments of the present disclosure. On the CloudPick pick cart side, a user may scan a barcode or press a button associated with the CloudPick pick cart. The CloudPick cart controller may then receive a message, and the CloudPick cart controller may send a message to the CloudPick computer system. The CloudPick computer system may receive the message, process the message, and then send a subsequent message to the CloudPick pick cart. The CloudPick cart controller associated with the CloudPick pick cart may receive that subsequent message and perform the action set forth in the subsequent message.

Figure 3:
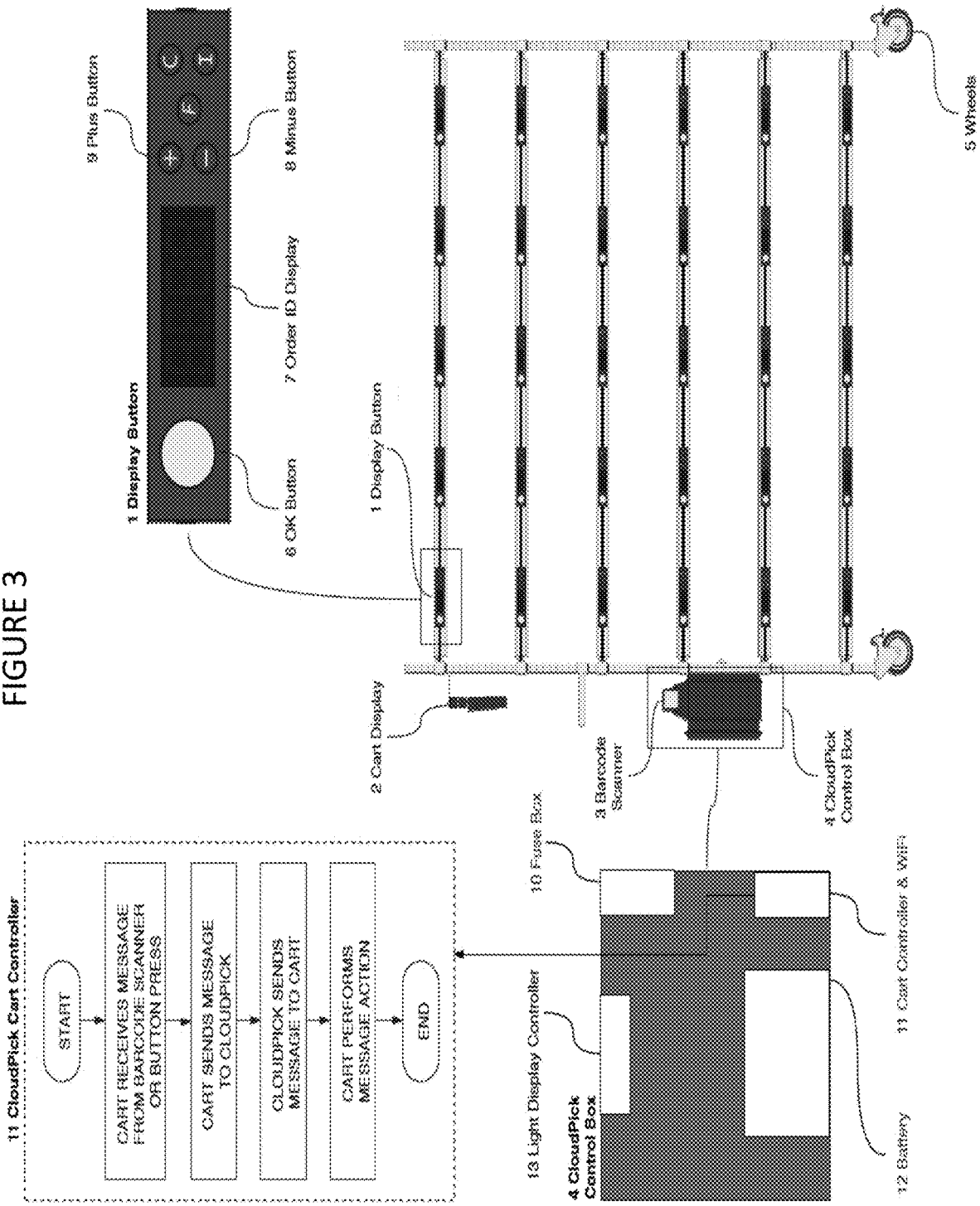
FIG. 3 depicts a CloudPick pick cart according to an embodiment of the present disclosure.

FIG. 3 depicts a CloudPick pick cart according to an embodiment of the present disclosure. As previously discussed, one or more CloudPick carts may be connected through Wi-Fi and/or an Internet connection to a CloudPick computer system. The CloudPick pick cart may include, but is not limited to, display button 1, cart display 2, barcode scanner 3, CloudPick control box 4, and wheels 5. Display button 1 may be positioned on the top portion of the CloudPick pick cart in an embodiment of the present disclosure. Display button 1 may include, but is not limited to, OK button 6, order ID display 7, minus button 8, and plus button 9. These buttons on display button 1 may allow the user of the CloudPick pick cart to trigger CloudPick cart controller 11 to communicate to the CloudPick computer system that the user has placed the required items in each location.

Barcode scanner 3 may support multiple functions in the distribution center or warehouse including, but not limited to, logging in and out of the picking system, identifying which item is to be picked, and/or verifying the location for picking. There may be barcode sheets provided to a user of the CloudPick pick cart so that the user may scan the barcode sheets using barcode scanner 3 to trigger one or more functions including, but not limited to, logging in and out of the picking system, identifying short picks, and/or performing other functions in embodiments of the present disclosure. CloudPick control box 4 may include, but is not limited to, fuse box 10, CloudPick cart controller 11 (which also may be referred to as cart controller and Wi-Fi), battery 12, and light display controller 13.

Each CloudPick pick cart may include CloudPick cart controller 11 that may be used to handle communication between the CloudPick pick cart and the CloudPick computer system. CloudPick cart controller 11 may be a computerized controller located on pick shelves in a distribution center or warehouse in embodiments of the present disclosure. CloudPick cart controller 11 and the CloudPick computer system may communicate over an Internet connection in embodiments of the present disclosure; however, other forms of communication may be utilized without departing from the present disclosure. FIG. 3 depicts the steps that may be utilized for CloudPick cart controller 11 to communicate with the CloudPick computer system in an embodiment of the present disclosure, as previously described in FIG. 2.

CloudPick cart controller 11 may report each action associated with the CloudPick pick cart back to the CloudPick computer system in real-time in embodiments of the present disclosure. The CloudPick computer system may respond by providing one or more instructions which may include, but are not limited to, identifying the next action that the CloudPick pick cart should take, turning lights on and off, changing light color(s), displaying pick quantities, indicating where to put items, and indicating where to take the CloudPick pick cart to pick the next item. Each of these one or more instructions may be provided in real-time.

For example, a radio frequency (RF)-connected handheld scanner, such as barcode scanner 3 (FIG. 3), may be used to scan a universal product code (UPC) or other barcode of an item being picked. The CloudPick computer system may then light up the button displays under all orders that require that item. In an embodiment, button displays may include a green light indicating that a single item is needed while a red light may indicate that multiple items are needed for the order. If the red light appears, the display next to the button may indicate the quantity of items needed for the order. While certain color lights are described herein, it should be appreciated that different colors and/or different numbers and types of lights may be used without departing from the present disclosure. The user (or picker) may place the required number of items in each order and press the button below that order tote. When that button is pressed, the CloudPick computer system may turn off each light and the associated display. When all quantities of the item have been placed in the appropriate orders, the CloudPick computer system may alert the user to move the CloudPick pick cart to the next pick location using the cart display panels, such as display button 1 (FIG. 3).

CloudPick cart controller 11 may receive one or more instructions from the CloudPick computer system and pass on those one or more instructions via light display controller 13 placed on the CloudPick pick cart to instruct the various elements on the CloudPick pick cart. Light display controller 13 may be in communication with one or more lighted displays within the distribution center or warehouse that may direct the user of the CloudPick pick cart where to place items and/or how many items to be placed in each location. Accordingly, the CloudPick computer system may control each element on the CloudPick pick cart, the elements including, but not limited to, lighted buttons, LED displays, and a barcode or other scanner that may include its own display screen and/or buttons.

Systems according to embodiments of the present disclosure may provide for an average of approximately a 25% increase in productivity over voice-controlled picking. In embodiments of the present disclosure, pre-built carts may be provided in a variety of capacities, including, but not limited to, 30, 60, or 120 tote capacities. There may be minimal integration requirements for a cost-effective, quick start up. Systems according to embodiments of the present disclosure may provide for clear display of commands/next steps on the cart screen or scanner. Reporting also may be provided for real-time visibility in embodiments of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A put-to-light picking system comprising:
a warehouse management system (WMS);
a computer system connected to the WMS through an application programming interface (API);
at least one pick cart, the at least one pick cart comprising:
a plurality of shelves;
a plurality of order totes on the plurality of shelves;
a cart display; and
a plurality of display buttons affixed to the plurality of shelves, the plurality of display buttons comprising at least an order ID display wherein each of the plurality of display buttons corresponds to one of the plurality of order totes;
a control box, the control box comprising a light display controller, a cart controller, and a Wi-Fi connector;
a handheld scanner, and
a code sheet that allows the handheld scanner to perform a variety of functions including at least logging in to the pick cart, logging out of the pick cart, identifying a product, confirmation that a product has been picked, and identifying short picks.

2. The put-to-light picking system of claim 1 further comprising:
a plurality of lights connected to the computer system, the plurality of lights operable to communicate with the light display controller to guide a user through a warehouse where the put-to-light picking system is installed.

3. The put-to-light picking system of claim 1, wherein the cart display is operable to display the next item to be gathered, its location in the warehouse, and instructions for the shortest route to the location in the warehouse.

4. The put-to-light picking system of claim 1, wherein the pick cart further comprises at least 4 wheels.

5. The put-to-light picking system of claim 1, the plurality of display buttons further comprising:
an OK button, a plus button, and a minus button.

6. The put-to-light picking system of claim 1, wherein the computer system and the cart controller remain in communication during the entirety of item picking.

7. The put-to-light system of claim 1, wherein the computer system provides access to real-time progress of the at least one pick cart.

8. The put-to-light system of claim 1, wherein the plurality of display buttons are operable to light up in a plurality of colors.

9. The put-to-light system of claim 1, wherein the handheld scanner is a radio-frequency (RF) barcode scanner.

10. A method for collecting products to fulfill online orders using a put-to-light picking computer system, the method comprising:
receiving a customer order from a client warehouse management system (WMS);
using a handheld scanner to read a code sheet to perform a variety of functions including at least logging in to the pick cart, logging out of the pick cart, identifying a product, confirming that a product has been picked, and identifying short picks;
transmitting at least one order to a cart controller associated with a pick cart, the at least one order including an identification of at least one product;
transmitting information about a first product identified in the at least one order and its location in a warehouse to the cart controller;
receiving confirmation from the cart controller that the first product has been located and placed in the pick cart;
transmitting information about a second product identified in the at least one order and its location in the warehouse to the cart controller; and
repeating the transmitting information and receiving confirmation steps until each of the at least one order assigned to the pick cart has been filled.

11. The method of claim 10 further comprising:
receiving a signal from a handheld scanner that the pick cart has arrived at a location in the warehouse for each of the at least one product identified in the at least one order; and
transmitting a signal to a plurality of display buttons to illuminate if the at least one product is to be placed in the pick cart.

12. The method of claim 11 further comprising:
transmitting instructions to the plurality of display buttons to illuminate a different color if more than one of the at least one product is to be placed in the pick cart.

13. The method of claim 10 further comprising:
transmitting signals to a plurality of lights placed throughout the warehouse to illuminate and guide the pick cart to a location of a next product identified in the at least one order.

14. The method of claim 10 further comprising:
transmitting real-time progress of the pick cart to the client WMS.

15. The method of claim 10 further comprising:
receiving a signal from a handheld scanner that a user has logged in to the pick cart, wherein the at least one order is then transmitted to the cart controller.

16. The method of claim 10 further comprising:
calculating a most efficient route through the warehouse for each of the at least one product identified in the at least one order.

17. A method for collecting products to fulfill online orders using a put-to-light picking computer system, the method comprising:
receiving a customer order from a client warehouse management system (WMS) through a third-party hosting service;
using a handheld scanner to read a code sheet to perform a variety of functions including at least logging in to the pick cart, logging out of the pick cart, identifying a product, confirming that a product has been picked, and identifying short picks;
transmitting at least one order to a cart controller associated with a pick cart, the at least one order including an identification of at least one product;
transmitting information about a first product identified in the at least one order and its location in the warehouse to the cart controller;
receiving confirmation from the cart controller that the first product has been located and placed in the pick cart;
transmitting information about a second product identified in the at least one order and its location in the warehouse to the cart controller; and
repeating the transmitting information and receiving confirmation steps until each of the at least one orders assigned to the pick cart have been filled.

18. The method of claim 17 further comprising:
receiving a signal from a handheld scanner that the pick cart has arrived at a product identified in the at least one order; and
transmitting a signal to a plurality of display buttons to illuminate if the product is needed in the at least one order.

19. The method of claim 17 further comprising:
transmitting signals to a plurality of lights placed throughout the warehouse to illuminate and guide the pick cart to the next product.

* * * * *